United States Patent
Miyazawa et al.

(10) Patent No.: US 6,549,248 B1
(45) Date of Patent: Apr. 15, 2003

(54) SYSTEM FOR A COMPACT PROJECTION DISPLAY USING REFLECTION TYPE LIQUID CRYSTAL PANELS

(75) Inventors: Toshio Miyazawa, Chiba (JP); Kaoru Yanagawa, Ichinomiya (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/518,679

(22) Filed: Mar. 3, 2000

(30) Foreign Application Priority Data

Apr. 8, 1999 (JP) .......................................... 11-101326

(51) Int. Cl.[7] .......................................... G02F 1/1335
(52) U.S. Cl. ..................... 349/9; 349/5; 349/8
(58) Field of Search ...................... 349/5, 8, 9; 353/81, 353/31, 20

(56) References Cited

U.S. PATENT DOCUMENTS

| | | | |
|---|---|---|---|
| 5,621,555 A | * | 4/1997 | Oku ............................... 349/5 |
| 5,795,047 A | * | 8/1998 | Sannohe et al. ............... 353/81 |
| 6,031,587 A | * | 2/2000 | Okuyama et al. .............. 349/8 |
| 6,062,694 A | * | 5/2000 | Oikawa et al. ................ 353/31 |
| 6,067,193 A | * | 5/2000 | Sekine et al. .................. 349/8 |
| 6,183,090 B1 | * | 2/2001 | Nakanishi et al. ............ 353/20 |

* cited by examiner

Primary Examiner—Julie Ngo

(57) ABSTRACT

The optical system comprises three reflection liquid crystal panels, polarization spliters PBS-R, PBS-G PBS-B which polarize components of an incident light to be reflected by the respective reflection liquid crystal panels, color separation and composition elements. The polarization splitters further separate the polarization converted output light in either an outputting direction or a non-outputting direction corresponding to the polarization, and the color separation and composition elements are arranged as separate elements in terms of optical path and in such a manner that these elements are disposed adjacent to each other in terms of space.

5 Claims, 8 Drawing Sheets

SYSTEM FOR A COMPACT PROJECTION DISPLAY USING REFLECTION TYPE LIQUID CRYSTAL PANELS

BACKGROUND OF THE INVENTION

The present invention relates to an optical system, and more particularly to an optical system which is suitable for a miniaturized projection type display apparatus which efficiently makes use of the space of a casing in which a light source, a liquid crystal display element, an image formation optical system and a projection optical system are mounted.

Liquid crystal display elements are popularly used as monitors for information equipment such as television receiver display devices or personal computers or display devices for other various display equipment. Among these equipment, equipment which use the liquid crystal display elements as the image forming means of the projection type display apparatus (projectors) has been recently utilized as the display equipment which are compact in size but are capable of a large screen display.

This kind of liquid crystal display element is generally constituted such that drive electrodes which work as feeding electrodes for selecting pixels or feeding electrodes for switching elements are formed on one substrate, common electrodes are formed on the other substrate, these substrates are adhered to each other with both electrode sides thereof facing each other in an opposed manner, and a liquid crystal layer is sandwiched in the gap defined between these adhered substrates.

On the other hand, with respect to image forming means, a reflection type liquid crystal display element which is constituted such that common electrodes are formed on a transparent substrate, drive electrodes are formed on an opaque substrate such as a silicon substrate these substrates are adhered to each other, and a liquid crystal layer or a polymer distributed type liquid crystal is sandwiched in the gap defined between these adhered substrates so as to form a liquid crystal panel, and this liquid crystal panel is embedded in a package is known as a compact liquid crystal display element capable of forming images of high definition.

The projection type liquid crystal display apparatus is equipment which generally forms images or the like on a liquid crystal panel, modulates (or controls) the transmitted light or the reflected light based on the generated image or the like, and projects the modulated light to a screen so as to obtain enlarged images.

FIG. 9 is an explanatory view showing an example of the construction of a liquid crystal panel which constitutes the reflection type liquid crystal display element employed by the present invention, wherein (a) is a plan view and (b) is a cross-sectional view taken along a line A—A in (a).

In this kind of liquid crystal display equipment, a liquid crystal composition or a polymer distributed type liquid crystal layer LC is sandwiched between one substrate (transparent substrate, common substrate) SUB1 and, the other substrate (drive substrate or silicon substrate) SUB2 and both substrates are adhered to each other by a seal material SL so as to form a reflection type liquid crystal panel and this panel is accommodated in the cavity of a package body PCG preferably made of resin, a flexible printed circuit board FPC for supplying signals and electricity is connected to one end periphery of the reflection type liquid crystal panel, and the panel is sealed by a front surface glass FGL so as to hermetically close the cavity.

The liquid crystal display equipment is further constituted such that a dielectric reflection film made of a multi-layered film covers electrodes formed on the inner surface of the drive substrate SUB2 or electrodes per se are formed into reflection bodies (mirror electrodes). Here, the latter example is illustrated.

A metallic radiating plate HSC is mounted on the back surface of the package body PCG in such a manner that the periphery thereof is embedded in the four sides of the lower portion of the package body PCG and the liquid crystal panel is accommodated between the front glass FGL and the radiating plate HSC by way of a radiating sheet HDS having a relatively large resiliency. Accordingly, the liquid crystal display equipment is constituted such that the back surface of the liquid crystal panel is hermetically adhered to the radiating heat plate HSC by way of the radiating sheet HDS and hence, a sufficient radiating effect can be obtained.

The liquid crystal panel accommodated in the inside of the cavity of the package body PCG has the back side of one substrate fixedly secured to a shoulder portion formed on the inner periphery of the bottom portion of the package body PCG by means of an adhesive material ADH. Further, the front glass FGL is fixedly secured to the package body PCG and a spacer SPC for fixing the flexible printed circuit board FPC by means of an adhesive agent or the like. The spacer SPC is fixedly secured to the flexible printed circuit FPC by an adhesive material not shown in the drawing.

The liquid crystal layer LC is required to perform a function of modulating a polarized light component (P wave, S wave) into a corresponding incident polarized light component and another polarized light component in accordance with an applied voltage corresponding to an image signal. Here, for simplifying the description hereinafter, the explanation is made on the condition that the reflection type liquid crystal panel modulates a component which exits from an optical block into a P wave for inputting of a S wave and reflects a component which is not outputted from the optical block as a S wave.

As such a reflection type liquid crystal panel, panels adopting methods such as a homogeneous ECB (Electrically Controlled Birefringence) which uses parallel oriented nematic liquid crystal and makes use of the birefringence of the liquid crystal, a homeotropic ECB which uses a vertical oriented nematic crystal and makes use of the birefringence of the liquid crystal, a HAN (Hybrid Aligned Nematic) type ECB which changes the orientation between the common substrate SUB1 side and the drive substrate SUB2 side, or a SPTN (Single Polarizer Twisted Nematic) having the liquid crystal structure twisted by making use of both properties of consisting of the optical rotatory and the birefringence the liquid crystal, or SCTN (Self Compensated Twisted Nematic) have been proposed and put into practice.

Subsequently, an optical system (an optical block) of a liquid crystal projector which uses the above-mentioned liquid crystal display clement is explained.

FIG. 10 is a schematic view explaining the optical block which constitutes a conventional projection type liquid crystal display apparatus (liquid crystal projector) which uses the reflection type liquid crystal panel shown in FIG. 9. This example of constitution is the simplest optical constitution of the optical system which uses three reflection type liquid crystal panels.

Further, FIG. 11 is an exploded view showing respective components disassembly to explain the function of the optical block shown in FIG. 10.

The optical system of this optical block is comprised of a lamp LMP, a polarization beam splitter PBS-G, a cross dichroic prism CD1, three reflection type liquid crystal panels RP-G, RP-B, RP-R and a projection lens PL.

An incident light IL outputted from the lamp LMP is separated into a S wave and a P wave by the polarization beam splitter PBS and these waves are respectively outputted in separate directions. Here, the explanation is made with respect to the optical system which uses the S wave as an input to the liquid crystal panels and hence, the S wave is directed to the cross dichroic prism CD and the P wave component is emitted to the outside of the optical system in FIG. 11.

The S wave component inputted to the cross dichroic prism CD is separated into wavelength components of red (R), green (G), blue (B) in the cross dichroic prism CD and they are respectively inputted to the reflection type liquid crystal panels RP-R, RP-G, RP-B which are in charge of these wavelength components.

Reflected lights RL-R, RL-G. RL-B which are subjected to the polarization modulation corresponding to the image signal as mentioned previously are outputted from the reflection type liquid crystal panels. Since these output lights are selectively subjected to the polarization modulation, the S wave component and the P wave component are mixed.

These reflected lights are composed again by the cross dichroic prism CD and is inputted to the polarization beam splitter PBS opposite to the incident light. In the polarization light beam splitter PBS, the P wave component of the output light passes through the dichroic face of the cross dichroic prism CD and it is inputted to the projection lens PL as it is and then projected.

On the other hand, the S wave component is reflected by the dichroic portion of the polarization beam splitter PBS and its direction is changed to lamp LMP direction and hence, it does not constitute an output.

In this manner, the output is only made of the P wave component modulated by the liquid crystal panel and hence, by controlling the voltage supplied to the liquid crystal panel corresponding to the image signal, the projected image corresponding to the image signal is obtained on a screen not shown in the drawing.

Although the above-mentioned optical block of conventional liquid crystal projector is the optical system having three reflection type liquid crystal panels, it requires the least number of parts and hence most compact. The greatest problem in realizing such an optical block is that a polarization beam splitter which is capable of covering the whole region of the visible light region becomes necessary.

The realization of such a polarization beam splitter is difficult at present and even if it may be possible, such a polarization beam splitter becomes expensive and large-sized.

It is an object of the present invention to overcome such problems of the prior art and to provide a practical and compact optical block.

SUMMARY OF THE INVENTION

To achieve the above object, in the present invention, an optical system is comprised of two cross dichroic prisms, three beam splitters, three mirror blocks, three reflection type liquid crystal panels, a lamp and a projection lens. Further, the optical block of the present invention is constituted such that a given number of dichroic mirrors are used in place of the cross dichroic prisms. Further, the optical block of the present invention is constituted such that a given number of mirrors or semi-transparent mirrors are used in place of the cross dichroic prisms or the dichroic mirrors.

The typical constitution of the optical system of the present invention is described as follows.

That is, the optical system comprises three reflection type liquid crystal panels which convert polarization based on an external control, first polarization splitters which perform a restriction such that necessary polarized components out of polarized components of an incident light are allowed to enter the reflection type liquid crystal panels, color separation and composition elements which perform a color separation where an incident white light is separated into three colors and color wave components necessary for respective reflection type liquid crystal panels are distributed and inputted to the reflection type liquid crystal panels and a recomposition where reflected lights of respective color components which are polarization modulated corresponding to image information controlled by the reflection type liquid crystal panels from outside are composed again, and second polarization splitters which separate the polarization converted output lights in either an outputting direction or a non-outputting direction corresponding to the polarization, wherein the color separation and composition elements are arranged as separate elements in terms of optical path and in such a manner that these elements are disposed adjacent to each other in terms of space.

Due to the above-mentioned respective constitutions, the optical block which is practical and compact in size can be provided.

BRIEF DESCRIPTION OF THE DRAWINGS

FIG. 1 is a schematic view explaining a first embodiment of an optical system according to the present invention which constitutes a projection type liquid crystal display apparatus.

FIG. 2 is an exploded view of the optical system shown in FIG. 1 showing an optical path of a red color component to explain the function thereof.

FIG. 3 is an exploded view showing an optical path of a green color component to explain the function thereof.

FIG. 4 is a developed view of the optical system shown in FIG. 1 of the optical system shown in FIG. 1 showing an optical path of a blue color component to explain the function.

FIG. 5 is a schematic view explaining a second embodiment of an optical system according to the present invention which constitutes a projection type liquid crystal display apparatus.

FIG. 6 is an exploded view of the optical system shown in FIG. 5 showing optical paths of respective color components to explain the function thereof.

FIG. 7 is a schematic view explaining the third embodiment of an optical system according to the present invention which constitutes a liquid crystal projector.

FIG. 8 is an exploded view of the optical system shown in FIG. 7 showing respective constituent parts separately to explain the function.

DETAILED DESCRIPTION OF THE PREFERRED EMBODIMENTS

Figure 1:
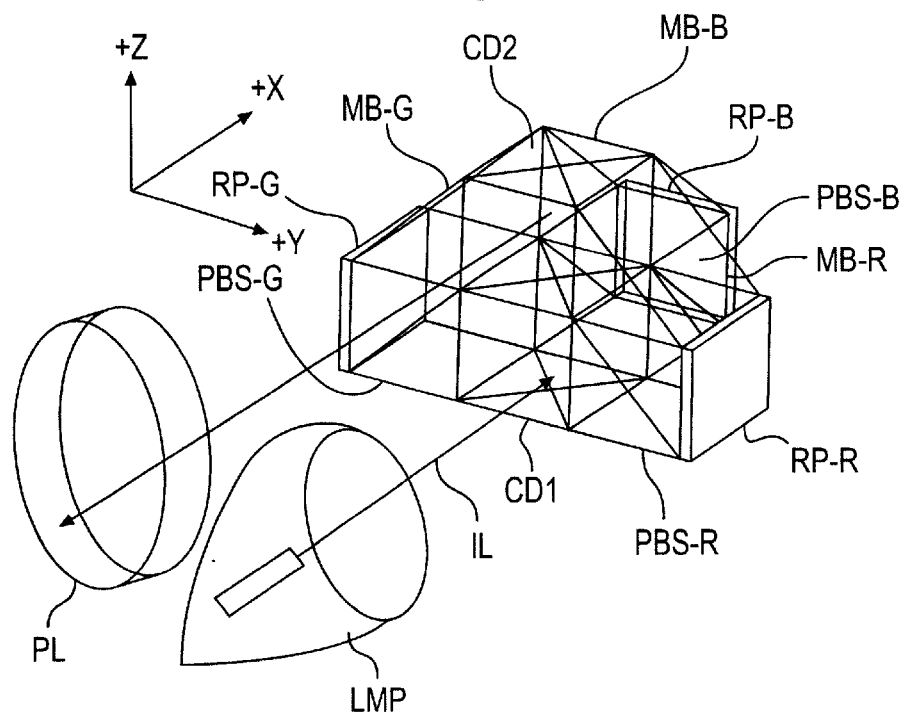
FIGS. 1–8 are presented as isometric projections wherein direction may be designated according to the orthogonal set of X, Y and Z reference axis provided on each drawing.
Figure 2:
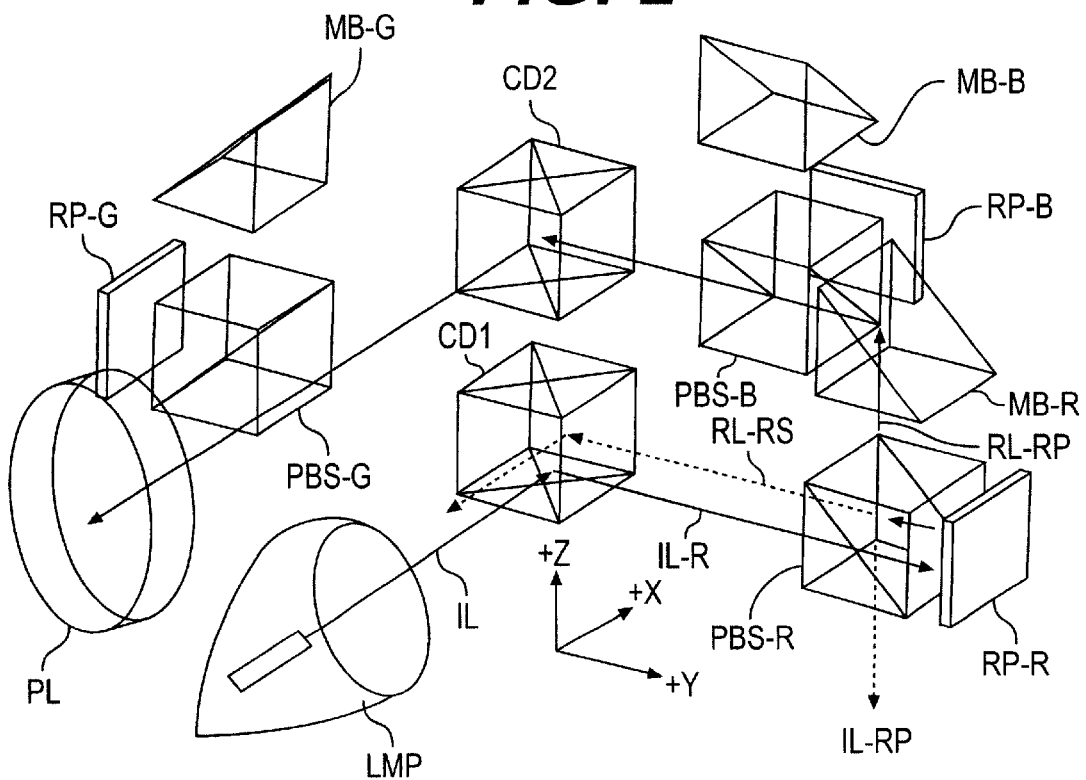
Figure 3:
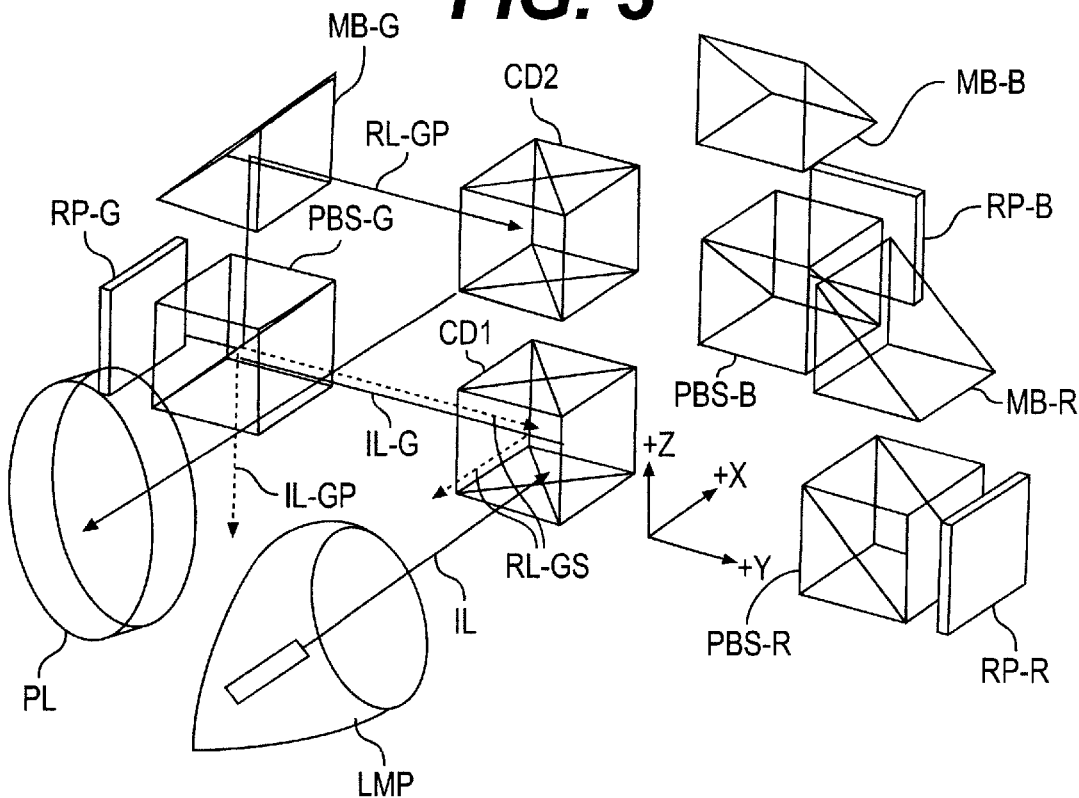
Figure 4:
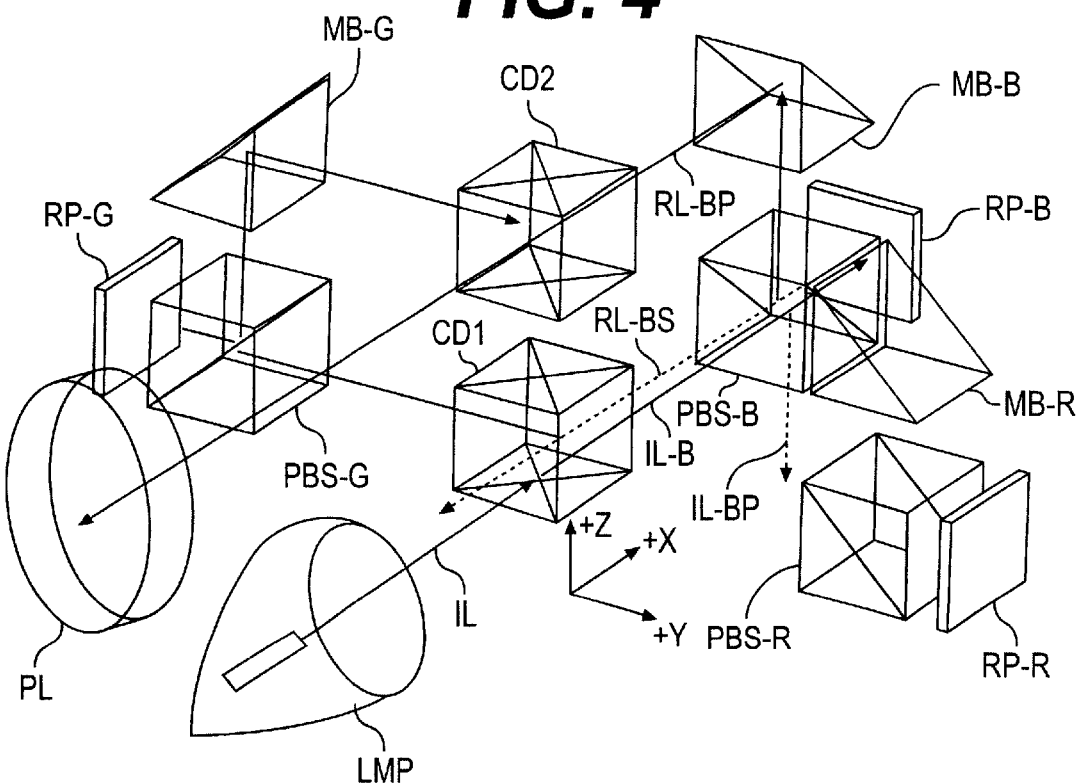

The mode for carrying out the present invention is explained in view of embodiments. FIG. 1 is a schematic view explaining a first embodiment of an optical system according to the present invention which constitutes a projection type liquid crystal display apparatus. FIG. 2 is an exploded view showing an optical path of a red color component where respective constituent parts are separated to explain the function of the optical block shown in FIG. 1. FIG. 3 is an exploded view showing an optical path of a green color component in the same condition. FIG. 4 is an exploded view showing an optical path of a blue color component in the same condition.

This embodiment includes an optical block which consists of two cross dichroic prisms CD1, CD2, three beam splitters PBS-R, PBS-G, PBS-B, three mirror blocks MB-R, MB-G, MB-B and three reflection type liquid crystal panels RP-R, RP-G, RP-B, a lamp LMP and a projection lens PL.

Firstly, the optical path of a red color component (hereinafter red color being simply called R) is explained in view of FIG. 2. An incident light IL emitted from the lamp LMP is separated into wavelength components of R, G, B by the first cross dichroic prism CD1. Out of these wavelength components, the R component is outputted in the direction of the polarization beam splitter PBS-R for R.

The R incident light IL-R is separated into a P wave component and a S wave component by this polarization beam splitter PBS-R and the P wave component IL-RP is outputted downwardly in the drawing and is emitted to the outside of the optical block.

On the other hand, the S wave component RL-RS is allowed to enter the reflection type liquid crystal panel RP-R and, here, is polarization modulated corresponding to an image signal and is outputted upon reflection by this liquid crystal panel. This reflected light is again separated into a P wave component and a S wave component by the polarization beam splitter PBS-R.

The S wave component RL-RS straightly advances through the polarization beam splitter PBS-R and returns to the lamp LMP tracing back the incident optical path. The P wave component RL-RP has the optical path thereof changed by the polarization beam splitter PBS-R and is allowed to enter the mirror block MB-R. Then, the P wave component RL-RP has the direction changed by 90 degrees by the mirror surface of the mirror block MB-R and is allowed to enter the second cross dichroic prism CD2. The P wave component is composed with other color components by the second cross dichroic prism CD2 and is outputted in the direction of the projection lens PL.

The optical path of a green color component (hereinafter green color being simply called G) is explained in view of FIG. 3. As in the case of the R component, the incident light IL emitted from the lamp LMP is separated into wavelength components of R, G, B by the first cross dichroic prism CD1. Out of these wavelength components, the G component is outputted in the direction of the polarization beam splitter PBS-G for G.

The G incident light IL-G is separated into a P wave component and a S wave component by this polarization beam splitter PBS-G and the P wave component IL-GP is outputted downwardly in the drawing and is emitted to the outside of the optical block.

On the other hand, the S wave component of IL-G is allowed to enter the reflection type liquid crystal panel RP-G and, here, is polarization modulated corresponding to an image signal and is outputted upon reflection by this liquid crystal panel. This reflected light is again separated into a P wave component and a S wave component by the polarization beam splitter PBS-G.

The S wave component RL-GS straightly advances through the polarization beam splitter PBS-G and returns to the lamp LMP tracing back the incident optical path. The P wave component RL-GP has the optical path thereof changed by the polarization beam splitter PBS-G and is allowed to enter the mirror block MB-G. Then, the P wave component RL-GP has the direction changed by 90 degrees by the mirror surface of the mirror block MB-R and is allowed to enter the second cross dichroic prism CD2 The P wave component is composed with other color components by the second cross dichroic prism CD2 and is outputted in the direction of the projection lens PL.

The optical path of a blue color component (hereinafter blue color being simply called B) is explained in view of FIG. 4. As in the case of the R component and the G component, the incident light IL emitted from the lamp LMP is separated into wavelength components of R, G, B by the first cross dichroic prism CD1. Out of these wavelength components, the B component is outputted in the direction of the polarization beam splitter PBS-B for B.

The B incident light IL-B is separated into a P wave component and a S wave component by this polarization beam splitter PBS-B and the P wave component IL-BP is outputted downwardly in the drawing and is emitted to the outside of the optical block.

On the other hand, the S wave component RL-BS is allowed to enter the reflection type liquid crystal panel RP-B and, here, is polarization modulated corresponding to an image signal and is outputted upon reflection by this liquid crystal panel. This reflected light is again separated into a P wave component and a S wave component by the polarization beam splitter PBS-B.

The S wave component RL-BS straightly advances through the polarization beam splitter PBS-B and returns to the lamp LMP tracing back the incident optical path. The P wave component RL-BP has the optical path thereof changed by the polarization beam splitter PBS-B and is allowed to enter the mirror block MB-B. Then, of the P wave component RL-BP has the direction changed by 90° by a mirror surface M-B of the mirror block MB-B and is allowed to enter the second cross dichroic prism CD2. The P wave component is composed with other color components by the second cross dichroic prism CD2 and is outputted in the direction of the projection lens PL.

In such a constitution, the second cross dichroic prism CD2 can be placed right on the first cross dichroic prism CD1 used for color separation and hence, the optical block can be made compact.

In addition to the difficulty in manufacturing, there may be a case that the cross point of the cross dichroic prism becomes a cause of the deterioration of the image quality. An embodiment which adopts independent dichroic mirrors in place of the cross dichroic prisms to obviate this phenomenon is explained hereinafter.

Figure 5:
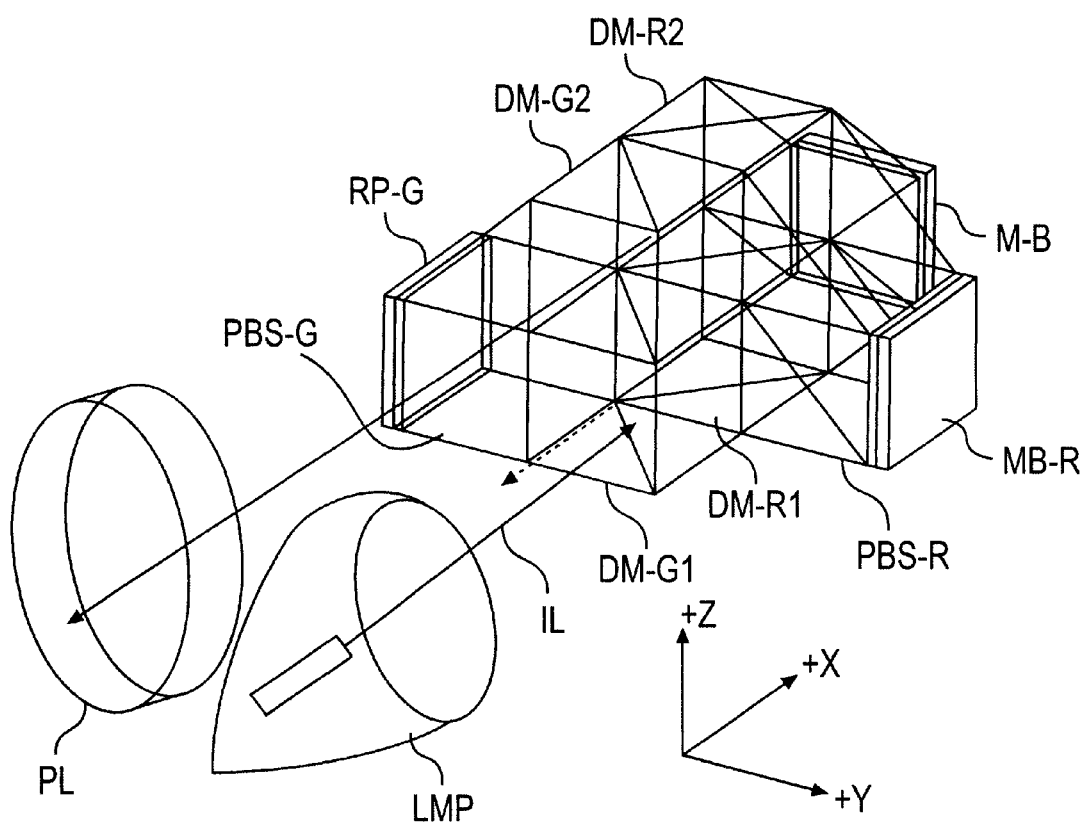
Figure 6:
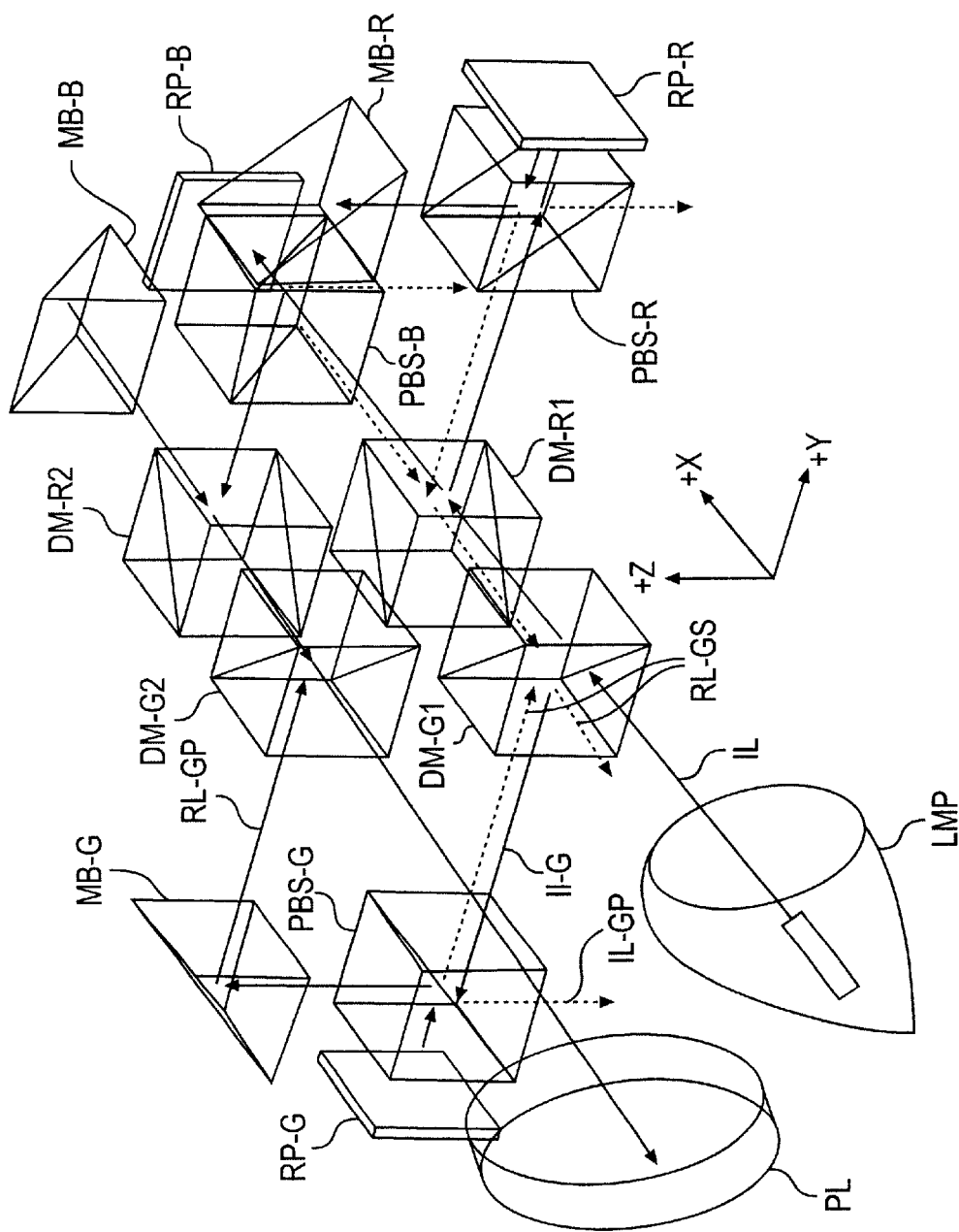

FIG. 5 is a schematic view explaining a second embodiment of an optical system according to the present invention which constitutes a projection type liquid crystal display apparatus. FIG. 6 is an exploded view of the optical block shown in FIG. 5 showing optical paths of respective color components where respective constituent parts are separated to explain the function.

In this embodiment, the optical block is constituted by dichroic mirrors DM-G1, DM-G2, DM-R1, DM-R2 in place of the cross dichroic prisms CD1,CD2 used in the first embodiment. The respective optical paths of a R component, a G component and a B component are shown in FIG. 6. The incident light from the lamp LMP is separated into respective P wave components and S wave components through the dichroic mirrors DM-G1, DM-G2, DM-R1, DM-R2 and the polarization beam splitters PBS-R, PBS-G, PBS-B and then the P wave components are modulated by the reflection type liquid crystal panels RP-R, RP-G, RP-B and are composed again and are projected to a screen not shown in the drawing in an enlarged scale by the projection lens PL.

In this embodiment, the composition dichroic mirrors DM-G2 for G can be placed right on the separation dichroic mirror DM-G1 and the composition dichroic mirror DM-R2 for R can be placed right on the separation dichroic mirror DM-R1 and hence, the optical block can be made compact.

The cross dichroic prisms, the dichroic mirrors and the polarization beam splitters in the above-mentioned respective embodiments may preferably be constituted by mediums which are transparent in the visible light region (for example, glass, optical plastic and so on) and they may be optically matched by a liquid or an adhesive material having the equal refractive index and hence, unnecessary reflection which gives rise to lowering of brightness and the image quality can be suppressed.

In case the refractive index of the above-mentioned medium is greater than that of air ($\neq 1$), an advantage that the length of the optical path can be prolonged effectively is obtained. However, the present invention is not limited to such a case.

Figure 7:
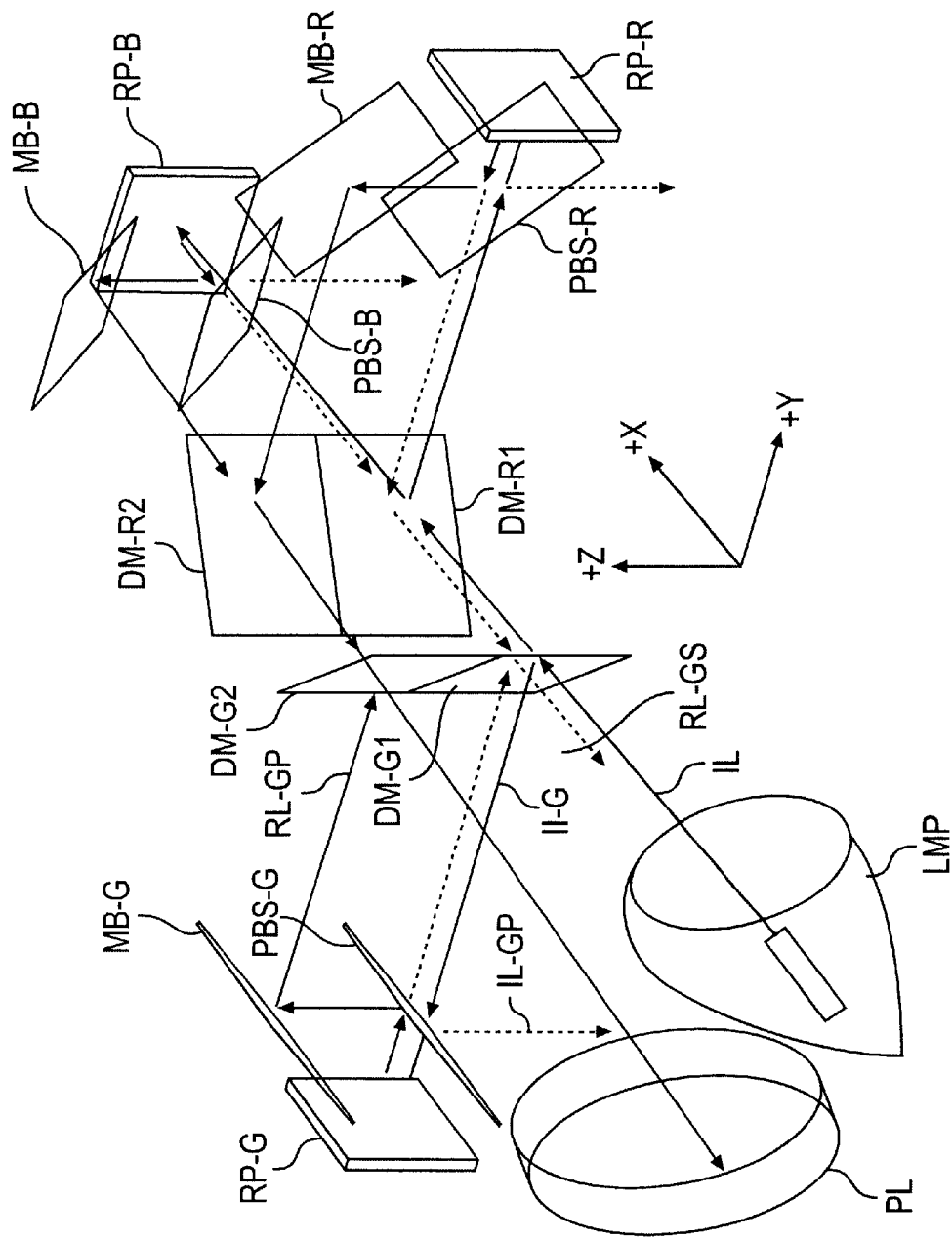

FIG. 7 is a schematic view explaining a third embodiment of an optical system according to the present invention which constitutes a projection type liquid crystal display apparatus.

Figure 8:
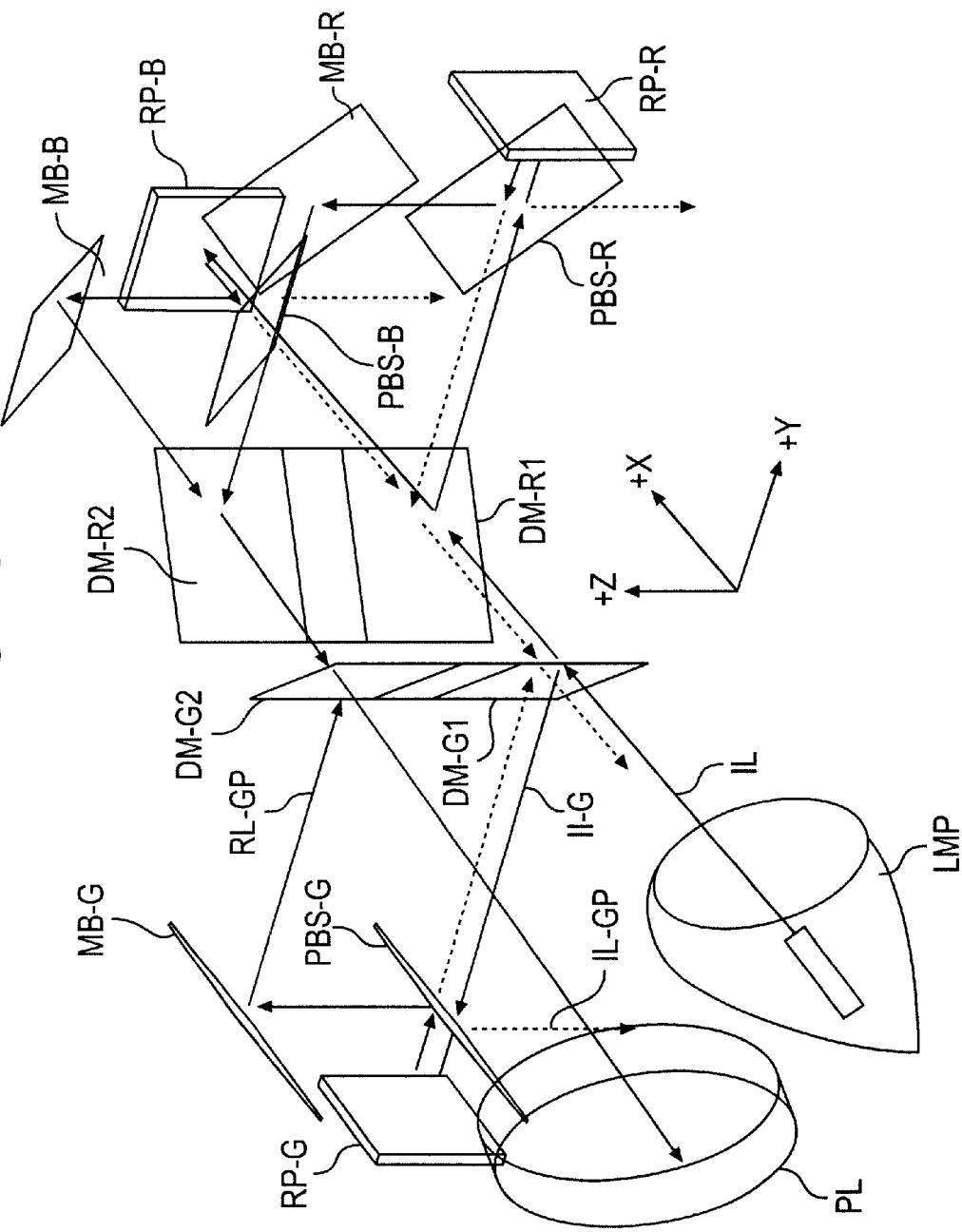
Figure 9A:
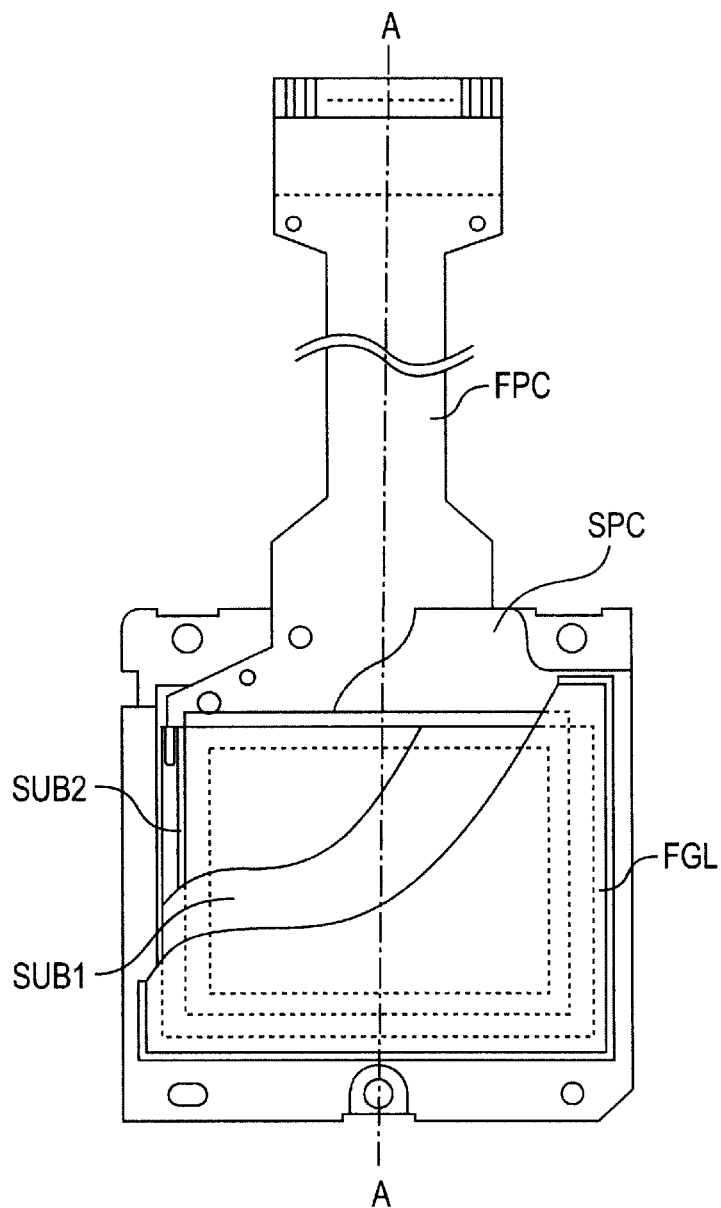
FIG. 9 is an explanatory view of an example of the constitution of a liquid crystal panel which constitutes a reflection type liquid crystal display element used in the present invention.
Figure 9B:
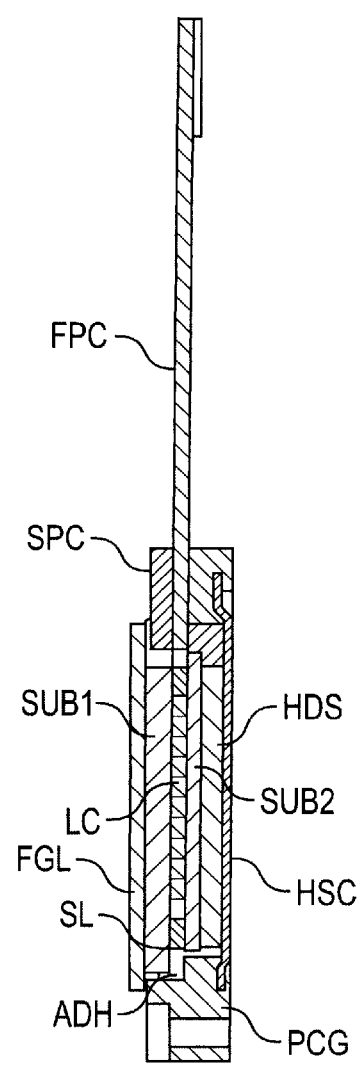
Figure 10:
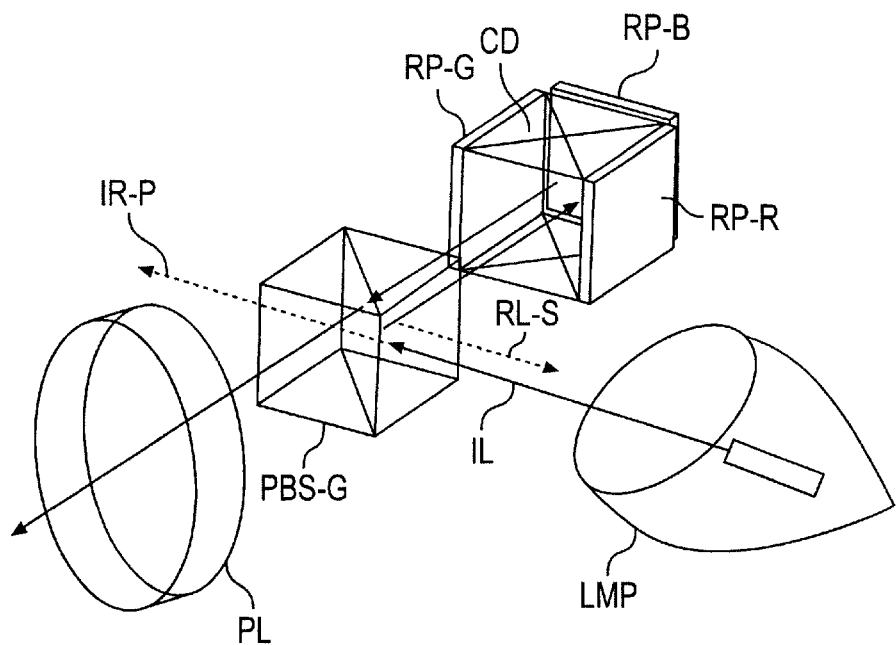
FIG. 10 is a schematic view explaining an optical system constituting a conventional liquid crystal projector which uses the reflection type liquid crystal display elements shown in FIG. 9.
Figure 11:
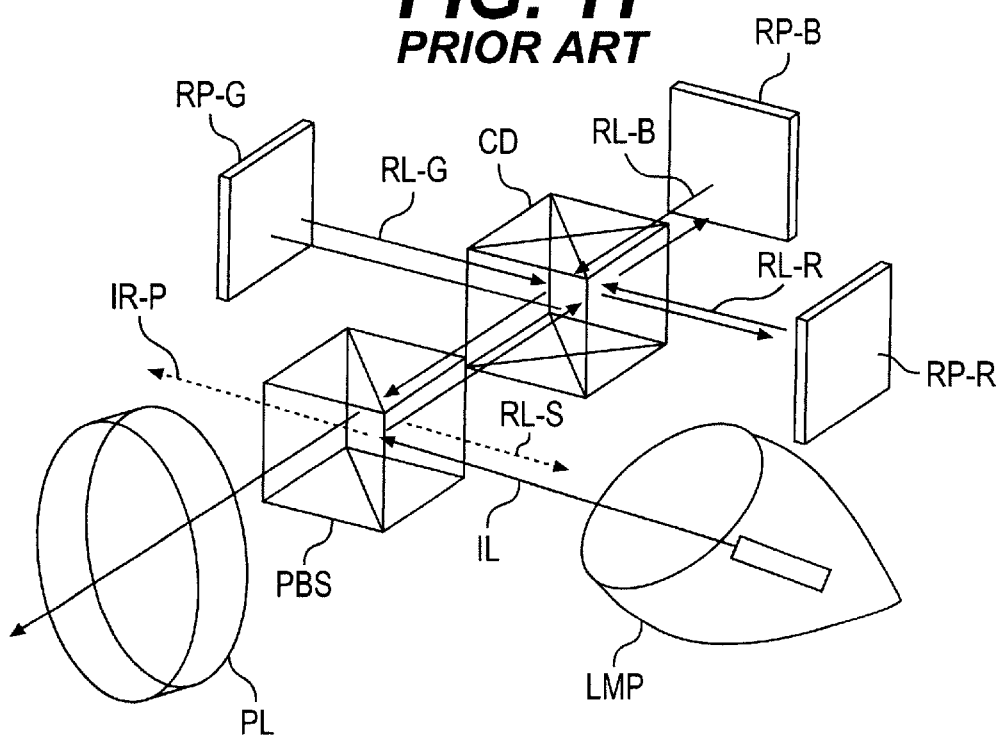
FIG. 11 is an exploded view of the optical system shown in FIG. 10 showing respective constituent parts separately to explain the function.

FIG. 8 is an exploded view showing respective constituent parts separately to explain the function of the optical block shown in FIG. 7. The exploded embodiment of FIG. 8 utilizes transparent or semi-transparent mirrors in place of the cross dichroic prisms or dichroic mirrors of the embodiments shown in FIGS. 1 and 5. In this embodiment, the optical block is constituted by transparent or semi-transparent mirrors (herein called "mirrors")whose functions are equivalent to the before-mentioned functions in the previous embodiments. Hence the same nomenclature shall be used.

The respective optical paths of a R component, a G component and a B component are shown in FIG. 8.

In the same format as in FIG. 6, the incident light from the lamp LMPN is separated into respective P wave components and S wave components through the mirrors functioning as dichroic mirrors DM-G1, DM-G2, DM-R1, DM-R2 and the mirrors functioning as polarization beam splitters PBS-R, PBS-G, PBS-B and then the P wave components are modulated by the reflection type liquid crystal panels RP-R, RP-G, RP-B and are composed again and are projected to a screen not shown in the drawing in an enlarged scale by the projection lens PL. As in the previous two embodiments, the mirrors can be positioned in close proximity to one another and hence the optical block can be made compact.

In this embodiment, the optical element which constitutes the optical block is constituted by mirrors or semi-transparent mirrors and the combination thereof. The optical paths for respective colors R, G, B are exactly as shown in FIG. 7 and FIG. 8.

A portion of mirrors or semi-transparent mirrors of this embodiment may be incorporated into the cross dichroic prisms or the dichroic mirrors of the previous embodiments.

Further, although in the above-mentioned respective embodiments, the light of the separated P wave components of the respective incident lights is emitted to the outside of the optical block, they may be returned to the lamp LMP, for example, by installing mirrors at the exits of the polarization beam splitters for P wave components so as to enhance the efficiency of the light source.

As has been explained heretofore, according to the present invention, by using two cross dichroic prisms, three beam splitters, three mirror blocks and three reflection type liquid crystal panels, or by using a given number of dichroic mirrors in place of the above-mentioned cross dichroic prisms, or using a given number of mirrors or semi-transparent mirrors in place of the above-mentioned cross dichroic prisms or dichroic mirrors, the compact optical system can be constituted so that the compact projection type display apparatus can be obtained.

What is claimed is:
1. An optical system comprising:
 a color separation element;
 a first, second, and third polarization elements;
 a first, second, and third reflection liquid crystal (LC) panels respectively disposed adjacent to a side of said first, second, and third polarization elements;
 a first, second, and third mirrors respectively disposed on top of said first, second, and third polarization elements; and
 a color combining element disposed on top of the color separation element,
 wherein
  X, Y, and Z coordinate directions represent mutually orthogonal axises;
  an incident light is entered into said color separation element in the X direction and separated into first, second and third wavelength band components;
  the first polarization element disposes on the right side of the color separation element in the Y direction, the second polarization element disposes on the left side of the color separation element in the Y direction, and the third polarization element disposes on the front of the color separation element in the X direction;
  said first, second and third wavelength band components respectively enter into said first, second, and third polarization elements and separate into first and second polarized components, whereby the first polarized components of the respective wavelength band components are reflected downward toward the bottom of each of the respective polarization elements, and the second polarized components of the respective wavelength band components are respectively passed there through to said first, second, and third reflection LC panels;
  said first, second, and third reflection LC panels respectively reflect the second polarized components of said first, second and third wavelength band components, which passed through each of said first, second and third polarization elements, back to the first, second and third polarization elements whereby the second polarized components are further separated into first and second secondarily-polarized components;

the first secondarily-polarized components respectively reflect to said first, second, and third mirrors whereby these first secondarily-polarized components are respectively directed by said first, second and third mirrors in the Z direction to the color combining element so that all the first secondarily-polarized components directed therein are to be combined for generating an output light; and the second secondarily-polarized components respectively pass through said first, second and third polarization elements and back to the color separation element.

2. A projection display apparatus comprising the optical system defined in claim 1, further comprising a light source and a projection lens for projecting the output light outputted from the color combining element.

3. An optical system according to claim 1, wherein each of said color separation element and said color combining element is made of a cross dichroic prism.

4. An optical system according to claim 1, wherein each of said color separation element and said color combining element is a dichroic mirror.

5. An optical system according to claim 1, wherein each of said polarization elements, said color separation element, and said color combining element is a mirror or a semi-transparent mirror.

* * * * *